Dec. 29, 1925.
J. BOVET ET AL
INSECT CATCHER
Filed June 14, 1923
1,567,905
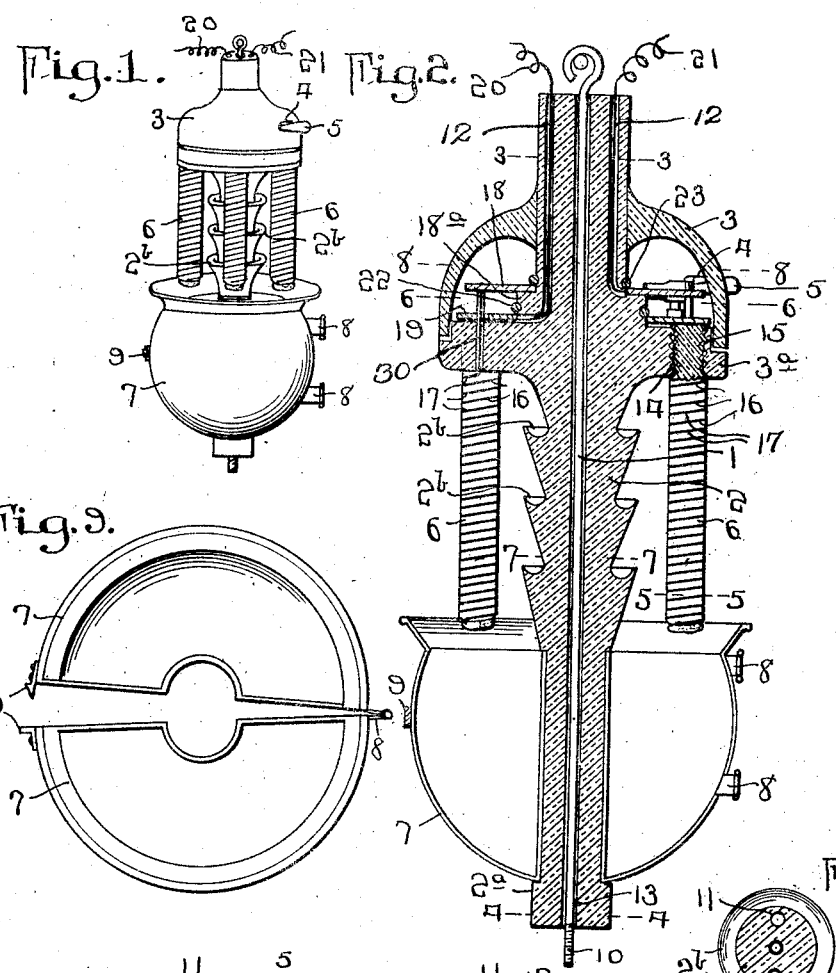
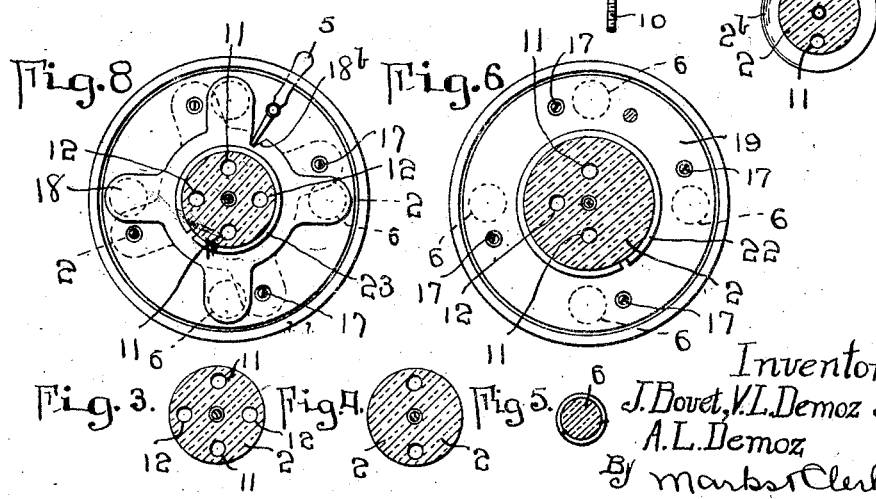
Inventors
J. Bovet, V. L. Demoz and
A. L. Demoz
By Marbst Clerk
Attys.

Patented Dec. 29, 1925.

1,567,905

UNITED STATES PATENT OFFICE.

JULIO BOVET, VENANZIO LALE DÉMOZ, AND ARTURO LALE DÉMOZ, OF BUENOS AIRES, ARGENTINA.

INSECT CATCHER.

Application filed June 14, 1923. Serial No. 645,460.

*To all whom it may concern:*

Be it known that we, JULIO BOVET, VENANZIO LALE DÉMOZ, and ARTURO LALE DÉMOZ, citizens of the Kingdom of Italy, residing at 4164 Victoria, Buenos Aires, Republic of Argentina, have invented certain new and useful Improvements in Insect Catchers, of which the following is a specification.

This invention relates to improvements in insect traps.

The primary object of the invention is to provide an insect trap which may, in one form, be used with electric lighting fixtures or the like, and which in another form, may be placed on a table for instance.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing:

Fig. 1 is a perspective view of one form of the apparatus suitable for use with electric lighting fixtures and the like.

Fig. 2 is an enlarged vertical sectional view of the same, the section being taken in a plane intersecting one of the pins 30 and one of the sleeves 15.

Fig. 3 is a sectional view on a reduced scale, taken on line 3—3 of Fig. 2.

Fig. 4 is a similar view taken on line 4—4 of Fig. 2.

Fig. 5 is a sectional view taken on line 5—5 of Fig. 2.

Fig. 6 is a sectional view taken on line 6—6 of Fig. 2.

Fig. 7 is a section on the line 7—7 Fig. 2.

Fig. 8 is a sectional view on line 8—8 of Fig. 2.

Fig. 9 is a top plan view of the receptacle to receive the electrocuted insects.

In the embodiment of the invention illustrated in Figs. 1 to 9 inclusive, 1 designates a metal rod provided at its upper end with a suspension hook by which it may be hung above any electric lighting fixture which is liable to attract insects. 2 designates a rod of porcelain or the like which surrounds the rod 1 and has an aperture 13 through which the rod 1 passes. The rod or support 2 has a circular enlargement or flange 3ª on which rests the lower edge of a cover or shade 3. The cover has a slot 4 to permit an insulated switch handle 5 to project to the exterior of the apparatus. The flange 3ª carries suspended pins 6 which are spirally grooved, for a purpose hereinafter described. The lower end of the support 2 is enlarged as shown at 2ª and surrounding the support and resting on its enlargement is a receptacle 7 of substantially spherical shape and formed in two halves or sections, which are hinged together at 8 and provided with a latch at 9. This receptacle is adapted to receive the dead insects and it may be detached from the support by simply loosening the latch 9 and swinging the two sections apart on the hinges.

The lower end of the rod 1 is threaded as shown on 10 to support the electric lighting fixture, not shown.

The support 2 has vertical holes 11 through which the wires for the electric light may pass. Holes 12 are also provided in the support 2 to receive the wires 20 and 21 which furnish the current for electrocuting the insects.

The flange 3ª of the support has four apertures 14 which receive conducting metal threaded sleeves 15 into which the upper ends of pins 6 are screwed. An uncovered wire 16 is spirally wound around each pin 6 in one of the grooves of the latter, and has its upper end secured to the sleeve 15 and its lower end fixed near the bottom of the pin. A similar exposed wire 17 is wound spirally around each pin in another groove, between the convolutions of the wire 16 and has its upper end extending upwardly along the supporting pin 30 extending through the flange 3ª of the insulating support or rod 2. The lower end of the wire 17 is fixed at the bottom of the pin and is spaced from the wire 16. The four ends of wires 17 which overlie the upper terminals of the pins 30 cooperate with a cross-shaped switch plate 18 which is rotatably mounted on a shoulder 18ª and is held in position by a split resilient ring 23. The wire 21 furnishes current to this plate 18 and said plate may be oscillated by the handle 5 which is pivotally mounted on the flange 3ª and enters a notch 18ᵇ in the plate 18. A lower plate 19 of conducting material is connected to the wire 20 and engages the sleeves 15 of conducting material and is provided with openings through which the pins 30 and wires 17 pass without making contact therewith. Due to this construction, it will be understood that when the plate 18 is turned to engage its arms with the wires 17, both the wires 16 and 17 will be in a circuit which may be closed by an insect bearing against the wires 16 and 17 simultaneously. In other words, when the parts are in the position shown in Fig. 2 and an insect alights on one of the pins 6, the current from one wire will travel through the insect to the other wire and in consequence the insect will be electrocuted and fall into the receptacle. To attract the insects, the intermediate portion of the support 2 is preferably provided with annular grooves 2ᵇ in which suitable bait may be placed.

A split resilient ring 22 may be used to hold the plate 19 in position.

While we have described the preferred form of the invention we are aware that various changes may be made in the details disclosed without departing from the spirit of the invention as expressed in the claims.

What we desire to secure by Letters-Patent is:

1. An apparatus of the class described including a rod like insulated support provided with an outwardly extending flange, insulated pins carried by said flange, wires wound about the pins in spaced relation and adapted to be arranged in a circuit which is completed by an insect bridging the space between the wires, a switch for controlling the passage of current to the portions of the wire arranged on the pins, a bait receptacle arranged on the support between the pins, and a receptacle arranged on the support below said pins for catching insects electrocuted on said wires.

2. An apparatus of the class described including a hollow rod-like support of insulating material provided with an outwardly extending flange, metallic sleeves extending through said flange, pins of insulating material having their upper ends arranged in said sleeves, a wire for furnishing current to all of said sleeves, wires wound about the pins in spaced relation and adapted to be arranged in a circuit which is completed by an insect bridging the space between the wires, a single switch associated with all of said pins for controlling the passage of current to certain of the wires arranged on the pins, a bait receptacle arranged on the support between the pins, and a receptacle arranged on the support below the pins for catching insects electrocuted on said wires.

3. An apparatus as claimed in claim 1 in which the last mentioned receptacle consists of two semi-circular vessels pivotally connected together and adapted to surround the support, whereby said vessels may be detached from the support without disturbing the latter.

In testimony whereof we affix our signatures.

JULIO BOVET.
VENANZIO LALE DÉMOZ.
ARTURO LALE DÉMOZ.